M. N. FEDERSPIEL.
ORTHODONTIA APPLIANCE.
APPLICATION FILED JULY 8, 1912.

1,044,764.

Patented Nov. 19, 1912.

Witnesses:

Inventor:
Matthew N. Federspiel,
By Dyrenforth, Lee, Chritton & Wiles,
Attys.

UNITED STATES PATENT OFFICE.

MATTHEW N. FEDERSPIEL, OF MILWAUKEE, WISCONSIN, ASSIGNOR TO BLUE ISLAND SPECIALTY CO., OF BLUE ISLAND, ILLINOIS, A CORPORATION OF ILLINOIS.

ORTHODONTIA APPLIANCE.

1,044,764. Specification of Letters Patent. Patented Nov. 19, 1912.

Application filed July 8, 1912. Serial No. 708,392.

*To all whom it may concern:*

Be it known that I, MATTHEW N. FEDERSPIEL, a citizen of the United States, residing at Milwaukee, in the county of Milwaukee and State of Wisconsin, have invented a new and useful Improvement in Orthodontia Appliances, of which the following is a specification.

My invention relates to certain new and useful improvements in orthodontia appliances, and is fully described and explained in the specification and shown in the accompanying drawings, in which:—

Figure 1:
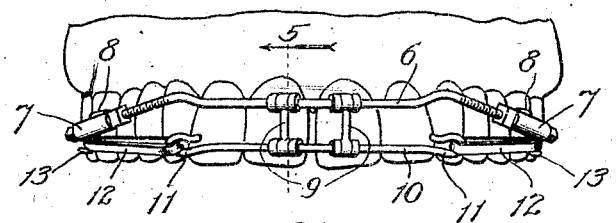
Figure 4:
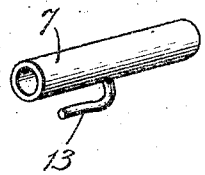
Figure 2:
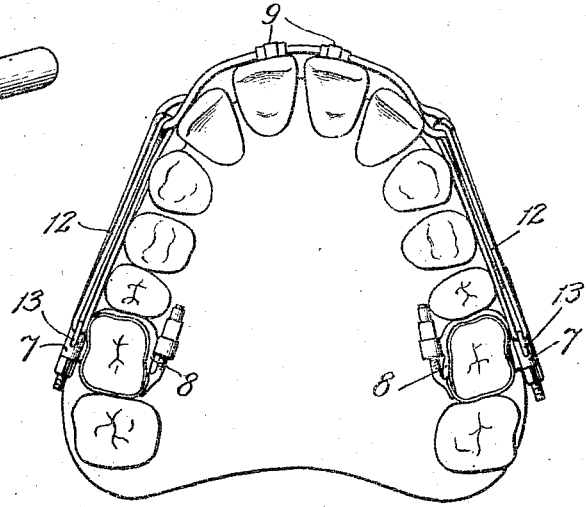
Figure 5:
Figure 3:
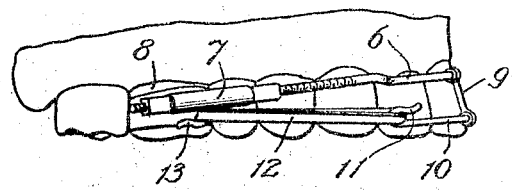

Figure 1 is a front elevation of my improved device showing the same in position; Fig. 2 is a plan view of the same; Fig. 3 is a side elevation; Fig. 4 is a perspective view of one of the buccal-tubes, and Fig. 5 is a section on the line 5, of Fig. 1.

While other useful functions for the present device may ultimately be discovered, the purpose for which it is especially designed is the moving of teeth which incline forwardly, or outwardly, from their proper position to a considerable extent. In the case, for instance, of a central incisor inclined forwardly to an abnormal extent, the practice has heretofore been to apply pressure by one of the well-known methods to the tip of said tooth, whereby to force the tip backward and change the angle of the tooth. This practice has been objectionable because, in some cases at least, the tooth has not turned about the end of the root as an axis, or center, but about some other point, so that as the tip has been forced backward, or in, the root has moved out and in some cases the root has even been forced partially out of the jaw. To remedy this difficulty, I provide an arch 6 of wire of ordinary form, carried by buccal-tubes 7 which are in turn supported by anchor-bands 8. The arch 6 is positioned immediately outside of the teeth, in close contact therewith and preferably closely adjacent to the edge of the gum, and is provided with the usual adjusting mechanism, so that any desired degree of pressure can be brought to bear on the teeth closely adjacent to the gum line. The arch 6 has two depending arms or links 9 pivotally supported by it, which arms carry a supplemental arch 10, preferably provided with hooks 11 at its ends. Elastic members 12, preferably in the form of ordinary rubber-bands of suitable strength, are arranged to draw backward the ends of the supplemental arch 10, which arch is so positioned as to lie near the tips of the teeth which are to be moved. The elastic members 12 are shown as engaging hooks 13 on the buccal-tubes, and this is a desirable construction, although it will be understood by those in the art that these tension-members can be supported in other ways, as for instance, from a suitable fitting on the opposite jaw, in accordance with common practice. The result of this construction is that the tips of the teeth are pushed backward gradually by the pressure of the supplemental arch 10 superinduced by the tension of the elastic members 12, while at the same time the upper portions and roots of the teeth are absolutely prevented from forward movement by the pressure thereagainst of the main arch 6. As a result, the necessary movement of the teeth is brought about without any danger of the roots improperly swinging forward.

I am aware that considerable variation is possible in the details of the construction herein shown and described, and therefore, by setting forth the preferred form in detail, I do not intend to limit myself thereto, except as pointed out in the following claims, in which the intention is to claim all the novelty inherent in the construction as broadly as is permitted by the state of the art.

I claim as new and desire to secure by Letters Patent:—

1. In combination, means engaging a tooth near its tip to move it rearwardly, and independent means engaging the tooth near its root to prevent forward movement thereof.

2. In combination, an arch to engage a tooth near the gum, and a secondary arch to engage the tooth near its tip, and means for exerting pressure on said secondary arch.

3. In combination, an arch to engage a tooth near the gum, a secondary arch, links connecting said arches, and means for exerting pressure on said secondary arch.

4. In combination, an arch to engage a tooth near the gum, a secondary arch, means connecting said arches, and elastic means connected to the secondary arch to exert pressure thereon.

5. In combination, an arch to engage a tooth near the gum, a secondary arch, a plurality of links connecting said arches, and elastic means connected to the secondary arch to exert pressure thereon.

6. In combination, an arch to engage a tooth near the gum, buccal-tubes supporting the same, a secondary arch to engage the tooth nearer the tip, links connecting said arches, and elastic members connecting the secondary arch with the buccal-tubes, for the purpose set forth.

In testimony whereof I have hereunto set my hand and affixed my seal this 26th day of June, 1912.

MATTHEW N. FEDERSPIEL. [L. S.]

In presence of two subscribing witnesses:
C. W. REEDER,
LILLY SCHMIDT.